United States Patent [19]
Mochizuki et al.

[11] Patent Number: 5,415,600
[45] Date of Patent: May 16, 1995

[54] METHOD FOR PREVENTING SLIPPING OF VEHICLE

[75] Inventors: Kazuhiko Mochizuki; Kenji Akuzawa; Hiromi Inagaki, all of Wako, Japan

[73] Assignee: Honda Giken Kogyo Kabushiki Kaisha, Tokyo, Japan

[21] Appl. No.: 20,092

[22] Filed: Feb. 19, 1993

[30] Foreign Application Priority Data

Feb. 21, 1992 [JP] Japan .................................. 4-034704

[51] Int. Cl.$^6$ ............................................. B60K 41/10
[52] U.S. Cl. .................................................. 477/110
[58] Field of Search ........................ 74/866; 364/424.1

[56] References Cited

U.S. PATENT DOCUMENTS

| | | | |
|---|---|---|---|
| 3,741,043 | 6/1973 | Oya et al. ...................... | 74/866 OR |
| 3,802,528 | 4/1974 | Leiber ................................. | 180/82 R |
| 4,984,161 | 1/1991 | Nakazawa et al. ............... | 74/866 X |
| 5,012,696 | 5/1991 | Miyawaki ......................... | 74/866 X |
| 5,012,910 | 5/1991 | Miyawaki ..................... | 364/424.1 X |
| 5,070,460 | 12/1991 | Yasuno ......................... | 364/424.1 X |
| 5,085,104 | 2/1992 | Kouno et al. ................... | 74/866 OR |
| 5,259,476 | 11/1993 | Matsuno et al. .................. | 74/866 X |

*Primary Examiner*—Dirk Wright
*Attorney, Agent, or Firm*—Armstrong, Westerman, Hattori, McLeland & Naughton

[57] ABSTRACT

A method for preventing the slipping of a vehicle engine during braking, by judging whether or not there is an excessive slipping of driven wheels on the basis of detection values detected by driven wheel speed detectors for detecting driven wheel speeds and detection values detected by follower wheel speed detectors for detecting follower wheel speeds, such that if it is decided that there is excessive slipping during engine braking, an actuator capable of changing the output from an engine mounted in the vehicle is operated to increase the output from the engine, wherein the method comprises steps of: detecting a gear position in a transmission disposed between the engine and driven wheels; determining a target engine revolution number on the basis of the gear position and the detection values of the follower wheel speeds at the time when it is decided that there is the excessive slipping; and determining a control amount for operation of the actuator on the basis of the target engine revolution number. Thus, it is possible to provide improvements in responsiveness and accuracy of the control conducted when excessive slipping is produced during engine braking.

3 Claims, 8 Drawing Sheets

METHOD FOR PREVENTING SLIPPING OF VEHICLE

BACKGROUND OF THE INVENTION

1. Field of the Invention

The field of the present invention is the prevention of slipping of a vehicle during engine braking, by judging whether or not there is produced an excessive slipping of driven wheels on the basis of detection values detected by driven wheel speed detectors for detecting driven wheel speeds and detection values detected by follower wheel speed detectors for detecting follower wheel speeds, such that if it is decided that excessive slipping is produced during braking, an actuator capable of changing the output from an engine mounted in the vehicle is operated to increase the output from the engine.

2. Description of the Related Art

There is a conventionally known method for preventing the slipping of a vehicle, wherein the output from the engine is increased in response to the occurrence of the excessive slipping of the driven wheels during engine braking, as disclosed in U.S. Pat. No. 3,802,528.

In the above prior art method, wheel speed is determined as a target value for the control, but what is directly controlled is a throttle valve. Thus, there exists a time lag from an instant of the control of the throttle valve before its effect is reflected in a change in wheel speed, and hence, the prior art method suffers from a lack of responsiveness.

SUMMARY OF THE INVENTION

Accordingly, the present invention consists of a method for preventing the slipping of a vehicle during engine braking, wherein improvements are provided in responsiveness and accuracy of the control conducted when an excessive slipping is produced.

To achieve the above object, according to the present invention, there is provided a method for preventing the slipping of a vehicle during engine braking, which comprises the steps of: detecting a gear position in a transmission disposed between the engine and driven wheels; determining a target engine revolution number on the basis of the gear position and the detection values of the follower wheel speeds at the time when it is decided that there is excessive slipping during braking; and determining a control amount for operation of the actuator on the basis of the target engine revolution number.

With the above feature of the present invention, the operation of the actuator directly reflected to the change in output from the engine can be controlled by use of the control value based on the engine RPM value, thereby improving the responsiveness and accuracy of the control.

The above and other objects, features and advantages of the invention will become apparent from the following description of a preferred embodiment, taken in conjunction with the accompanying drawings.

DESCRIPTION OF THE PREFERRED EXEMPLARY EMBODIMENT

The present invention will now be described by way of a preferred embodiment mounted on a front wheel drive vehicle in connection with the accompanying drawings.

Figure 1:
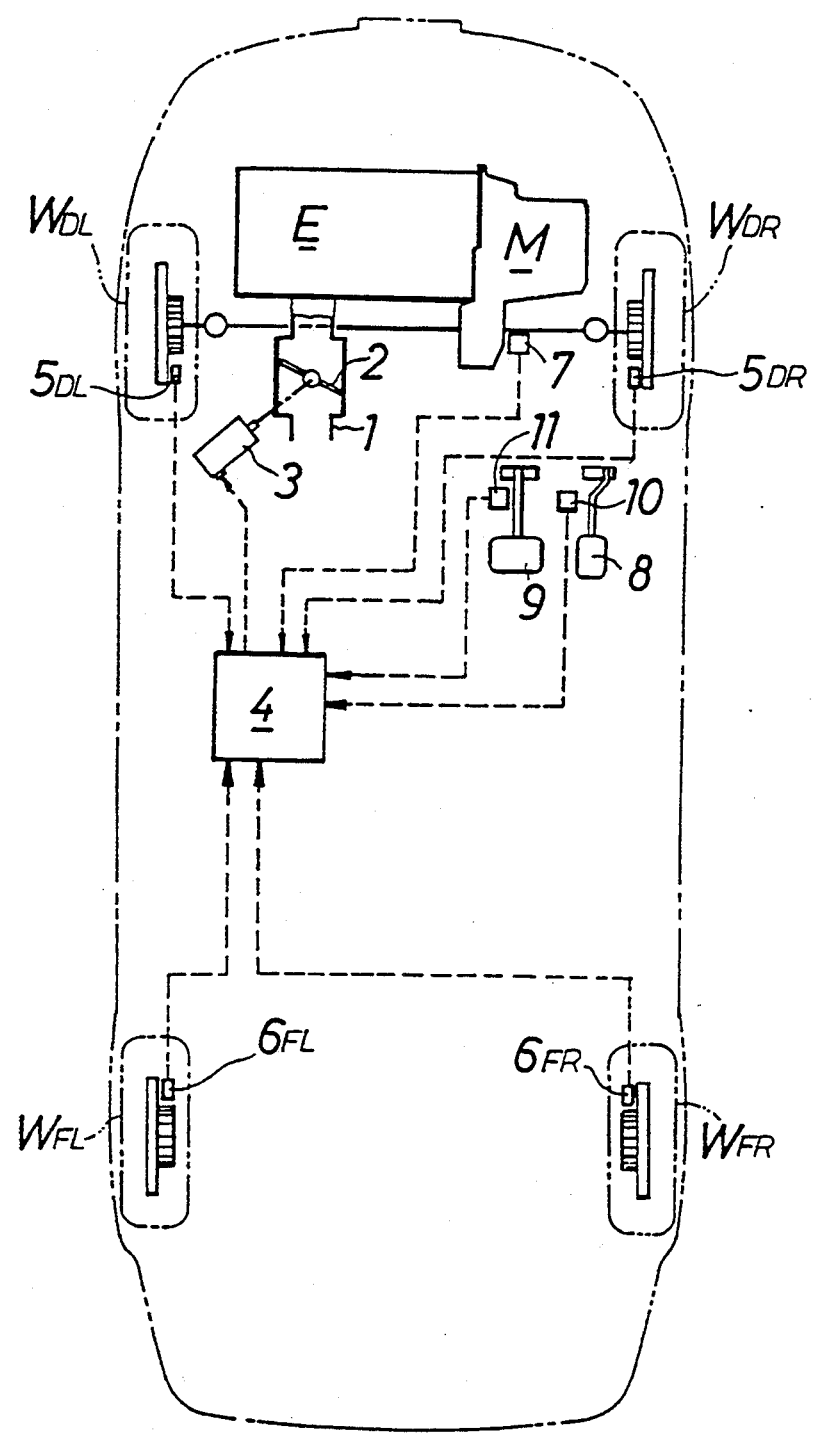
FIG. 1 is an illustration of a driving system of a front wheel drive vehicle.

Referring first to FIG. 1, an output from an engine E mounted on a front wheel drive vehicle is transmitted through a transmission M to left and right driven wheels $W_{DL}$ and $W_{DR}$ which are left and right front wheels. A throttle valve 2 which can be opened and closed is disposed in the middle of an intake pipe 1 in the engine E for adjusting the amount of fuel flowing through the intake pipe 1 to control the output from the engine E. The throttle valve 2 is operated by an actuator 3 such as step motor.

The operation of the actuator 3 is controlled by a control unit 4. Connected to the unit 4 are driven-wheel speed detectors $5_{DL}$ and $5_{DR}$ for detecting speeds of the left and right driven wheels $W_{DL}$ and $W_{DR}$, respectively; follower-wheel speed detectors $6_{FL}$ and $6_{FR}$ for detecting speeds of left and right follower wheels $W_{FL}$ and $W_{FR}$ which are left ad right rear wheels, respectively; a gear position detector 7 for detecting a gear position in the transmission M; an accelerator operation amount detector 10 for detecting the amount of operation of an accelerator pedal 8 as an accelerating member operated by a driver to adjust the output from the engine E; and a brake switch 11 adapted to detect the depression of a brake pedal 9 for braking operation, thereby delivering a high level signal.

Figure 2:
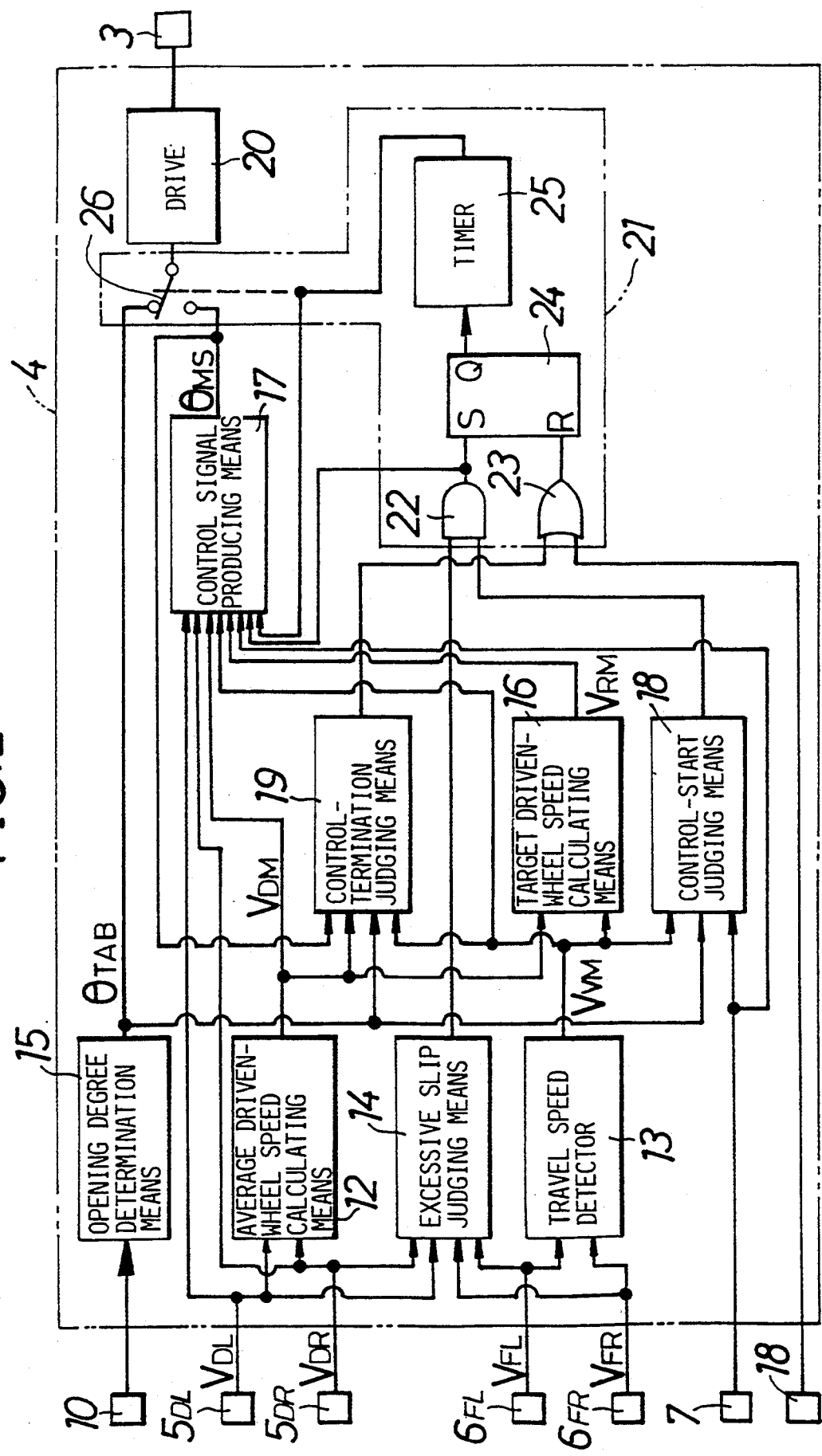
FIG. 2 is a block diagram illustrating the arrangement of a control unit.

Referring to FIG. 2, the control unit 4 comprises an average driven-wheel speed calculating means 12 for averaging detection values $V_{DL}$ and $V_{DR}$ detected by the driven-wheel speed detectors $5_{DL}$ and $5_{DR}$ to calculate an average driven-wheel speed $V_{DM}$; a travel speed detector 13 for averaging detection values $V_{FL}$ and $V_{FR}$ detected by the follower-wheel speed detectors $6_{FL}$ and $6_{FR}$ to provide a vehicle travel speed $V_{VM}$; an excessive slip judging means 14 for judging whether or not there is an excessive slipping produced by the driven wheels $W_{DL}$ and $W_{DR}$ on the basis of the detection values $V_{DL}$ and $V_{DR}$ detected by the driven-wheel speed detectors $5_{DL}$ and $5_{DR}$ and the detection values $V_{FL}$ and $V_{FR}$ detected by the follower-wheel speed detectors $6_{FL}$ and $6_{FR}$; and an opening degree determination means 15 for determining an opening degree $\Theta_{TAB}$ of the throttle value 2 corresponding to the operation amount of the accelerator pedal on the basis of a detection value detected by the accelerator operation amount detector 10. A target driven-wheel speed calculating means 16 calculates a target driven-wheel speed $V_{RM}$ on the basis of the detection value $V_{VM}$ detected by travel speed detector 13 and the average driven-wheel speed $V_{DM}$ provided by the average driven-wheel speed calculating means 12. A control signal producing means 17 determines a control signal $\Theta_{MS}$ indicative of a command to operate the actuator 3 to increase the output from the engine E, when the excessive slipping is produced, on the basis of the driven wheel speeds $V_{DL}$ and $V_{DR}$ detected by the driven-wheel speed detectors $5_{DL}$ and $5_{DR}$; the gear position in the transmission M detected by the gear position detector 7; the average driven-wheel speed $V_{DM}$ determined in the average driven-wheel speed calculating means 12; the vehicle travel speed $V_{VM}$ provided by the travel speed detector 13; and the target driven-wheel speed $V_{RM}$ determined in the target driven-wheel speed calculating means 16. A control start judging means 18 judges a condition in which a control to increase the output from the engine E can be started, on the basis of the gear position detected by the gear position detector 7, the vehicle travel speed $V_{VM}$ provided by the travel speed detector 13 and the opening degree $\Theta_{TAB}$ determined in the opening degree determination means 15, thereby delivering a control-start permitting signal. A control-termination judging means 19 judges a timing of termination of the control which increases the output from the engine E on the basis of the average driven-wheel speed $V_{DM}$ determined in the average driven-wheel speed calculating means 12; the vehicle travel speed $V_{VM}$ provided by the travel speed detector 13; the opening degree $\Theta_{TAB}$ determined in the opening degree determination means 15; and the control signal $\Theta_{MS}$ delivered from the control signal producing means 17, thereby delivering a control-termination signal. A driving means 20 operates the actuator 3. A control limiting means 21 alternatively selects one of the control signal $\Theta_{MS}$ from the control signal producing means 17 and the opening degree $\Theta_{TAB}$ determined in the opening degree determination means 15, which is to be supplied to the driving means 20, in accordance with outputs from the brake switch 11, the excessive slip judging means 14, the control-start judging means 18 and the control-termination judging means 19, thereby limiting the control for operating the actuator 3 to increase the output from the engine E.

The excessive slip judging means 14 delivers a high level signal on the basis of the decision of the fact that there is an excessive slipping produced by the driven wheels $W_{DL}$ and $W_{DR}$, when the following first and second judging conditions are established.

First judging condition: {right follower wheel speed $V_{FR}$ — right driven wheel speed $V_{DR} \geq \Delta V_R$} or {left follower wheel speed $V_{FL}$ — left driven wheel speed $V_{DL} \geq \Delta V_L$} is established, wherein each of $\Delta V_R$ and $\Delta V_L$ is a given speed threshold value, e.g., 1.5 km/hr.

Second judging condition: the deceleration $(-dV_{DR}/dt)$ of the right driven wheel speed $V_{DR}$ is larger than a predetermined deceleration $(-\alpha)$ in a condition in which the right follower wheel speed $V_{FR}$ > the right driven wheel speed $V_{DR}$, or the deceleration $(-dV_{DL}/dt)$ of the left driven wheel speed $V_{DL}$ is larger than the predetermined deceleration $(-\alpha)$ in a condition in which the left follower wheel speed $V_{FL}$ > the left driven wheel speed $V_{DL}$, wherein $(-\alpha)$ is, for example, $-40$ m/sec$^2$.

In the target driven-wheel speed calculating means 16, the target driven wheel speed $V_{RM}$ is calculated through first, second and third steps which will be described below, on the basis of the vehicle travel speed $V_{VM}$ and the average driven wheel speed $V_{DM}$.

First step: The target driven wheel speed $V_{RM}$ obtained in consideration of a predetermined slip rate in addition to the vehicle travel speed $V_{VM}$ has been previously prepared in a map shown in FIG. 3, and a target driven wheel speed $V_{RM}$ corresponding to a vehicle travel speed $V_{VM}$ is tentatively determined from the map.

Second step: The tentative value determined at the first step is used as a target driven wheel speed $V_{RM}$, when the vehicle travel speed $V_{VM}$ minus the average driven wheel speed $V_{DM}$ exceeds 2 km/hr.

Third step: A virtual target driven wheel speed is determined and used as a target driven wheel speed $V_{RM}$, when the vehicle travel speed $V_{VM}$ minus the average driven wheel speed $V_{DM}$ is equal to or less than 2 km/hr. In finding the virtual target driven wheel speed, a deceleration (a differentiation value) of the vehicle travel speed $V_{VM}$ at the time when the vehicle travel speed $V_{VM}$ minus the average driven wheel speed $V_{DM}$ is equal to or less then 2 km/hr, is determined, and a value reduced from the last-time target driven wheel speed by a successive decrement determined in accordance with such deceleration is used as the virtual target driven wheel speed. More specifically, an average value of past differences between every calculated vehicle travel speeds $V_{VM}$, for example, six past differences, is calculated, and a successive decrement $\Delta V_{RM}$ corresponding to such average difference value is found from Table 1 previously established. Thus, the now or current virtual target driven wheel speed $V_{RM(K)}$ is determined as a value resulting from subtraction of the successive decrement $\Delta V_{RM}$ from the last target driven wheel speed $V_{RM(K-1)}$ (i.e., $V_{RM(K)} = V_{RM(K-1)} - \Delta V_{RM}$).

TABLE 1

| | Average difference value | | | |
|---|---|---|---|---|
| | <0.05 | ~0.10 | ~0.15 | >0.15 |
| Successive decrement $\Delta V_{RM}$ | 0.05 | 0.10 | 0.16 | 0.21 |

Figure 4:
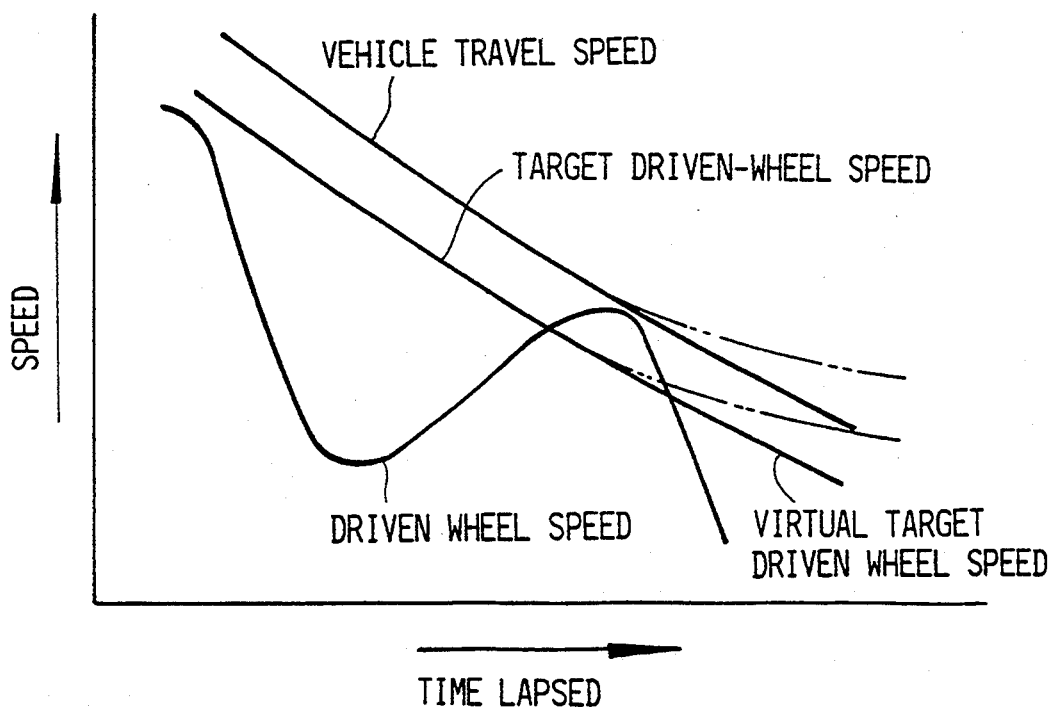
FIG. 4 is a diagram for explaining the reason why the virtual target driven wheel speed is determined.

The physical meaning of determination of the virtual target driven wheel speed in the above-described manner will be described below with reference to FIG. 4. When the driven wheel speed is restored to an extent such that it is too near the vehicle travel speed, the deceleration of the vehicle travel speed is moderated as shown by a dashed line in FIG. 4. If the target driven wheel speed is determined on the basis of the vehicle travel speed having the moderated deceleration, the target driven wheel speed also tends to rise, as shown by a dashed line in FIG. 4, and as a result, an effective engine brake cannot be obtained. Thereupon, in such a case, a value resulting from reduction of the target driven wheel speed by a given successive decrement determined in accordance with the deceleration of the vehicle travel speed is determined as the virtual target driven wheel speed, thereby ensuring that effective engine braking can be obtained.

The control-start judging means 18 judges the timing of starting the control of the operation of the actuator 3 to increase the output from the engine, on the basis of the gear position in the transmission M, the vehicle travel speed $V_{VM}$ and the throttle opening degree $\Theta_{TAB}$, and delivers a high level control-start permitting signal, when a condition as described below is established.

That is, when a downshifting has been conducted, or when the variation rate in the throttle opening degree $\Theta_{TAB}$ toward the closed state, which is based on the operation amount of the accelerator pedal 8, has become larger than a given value (i.e., when the sudden releasing-off of the accelerator pedal has been conducted) in a condition in which the vehicle travel speed $V_{VM}$ is equal to or more than 10 km/hr, the control-start judging means 18 produces a high level control-start permitting signal sustained for a predetermined time, e.g., one second.

The control-termination judging means 19 judges the timing of termination of the control of the operation of the actuator 3 to increase the output from the engine, on the basis of the average driven wheel speed $V_{DM}$, the vehicle travel speed $V_{VM}$, the throttle opening degree $\Theta_{TAB}$ and the control signal $\Theta_{MS}$ delivered from the control signal producing means 17, and produces a high level control-termination signal, when a condition as described below is established.

That is, when a condition in which both of relationships, $(\Theta_{MS}-\Theta_{TAB}\Delta\Theta_0)$ and $(|V_{VM}-V_{DM}|<\Delta V_0)$ are established, is continued, for example, for 500 ms or more, the control-termination judging means 19 produces the high level control-termination signal. In the above expression, $\Delta\Theta_0$ is a given value, for example, determined at 1.0 degree, and $\Delta V_0$ is a given value, for example, determined at 1.0 km/hr. A condition in which the relationship, $(\Theta_{MS}-\Theta_{TAB}\leq\Delta\Theta_0)$ is established, indicates a condition in which even if the control of the operation of the actuator 3 to increase the output from the engine is continued, such control is terminated, thereby causing the engine brake amount demanded by the vehicle's driver to coincide with a controlled proper engine brake amount, when the accelerator pedal 8 has been depressed again by the vehicle's driver. A condition in which the relationship, $(|V_{VM}-V_{DM}|<\Delta V_0)$ is established, indicates a condition in which the average driven wheel speed $V_{DM}$ has been restored to the vehicle travel speed $V_{VM}$. Even if the throttle opening degree demanded by the vehicle's driver coincides with a controlled proper opening degree, a locking tendency may be still not eliminated in some cases and for this reason, the control is terminated in a condition in which the average driven wheel speed $V_{DM}$ has been restored to the vehicle travel speed $V_{VM}$.

The control limiting means 21 comprises an AND gate 22 to which outputs from the excessive slip judging means 14 and the control-start judging 18 are inputted in parallel; an OR gate 23 to which the control-termination judging means 19 and the brake switch 11 are connected in parallel; a flip-flop 24 having an input terminal to which an output from the AND gate 22 is inputted, and having a reset input terminal to which an output from the OR gate 23 is inputted; a timer 25 for producing a signal which is changed from a high level to a low level after a lapse of a predetermined time from the falling of an output from the flip-flop 24, when the output from the flip-flop 24 has been changed from a high level to a low level; and a switch circuit 26 for alternatively connecting either one of the opening degree determination means 15 and the control signal producing means 17 to the driving means 20 in response to the output signal from the timer 25. The switch circuit 26 permits the throttle opening degree $\Theta_{TAB}$ determined in the opening degree determination means 15 to be supplied into the driving means 20, when the output from the timer 25 is at the low level, and permits the control signal $\Theta_{MS}$ from the control signal producing means 17 to be supplied into the driving means 20, when the output from the timer 25 has become the high level.

With such control limiting means 21, the control signal $\Theta_{MS}$ from the control signal producing means 17 is applied to the driving means 20, when the high level control-start permitting signal is delivered from the control-start judging means 18 in a condition in which it has been decided in the excessive slip judging means 14 that an excessive slipping has been produced by either one of the driven wheels $W_{DL}$ and $W_{DR}$. In response to the delivery of a high level signal from the brake switch 18 or the delivery of a high level control-termination signal from the control-termination judging means 19 as a result of depression of the brake pedal 9 by the vehicle's driver after the start of the control, the output from the flip-flop 24 is changed from the high level to the low level, and after a lapse of a predetermined time from such changing, the throttle opening degree $\Theta_{TAB}$ from the opening degree determination means 15 is applied to the driving means 20.

Figure 5:
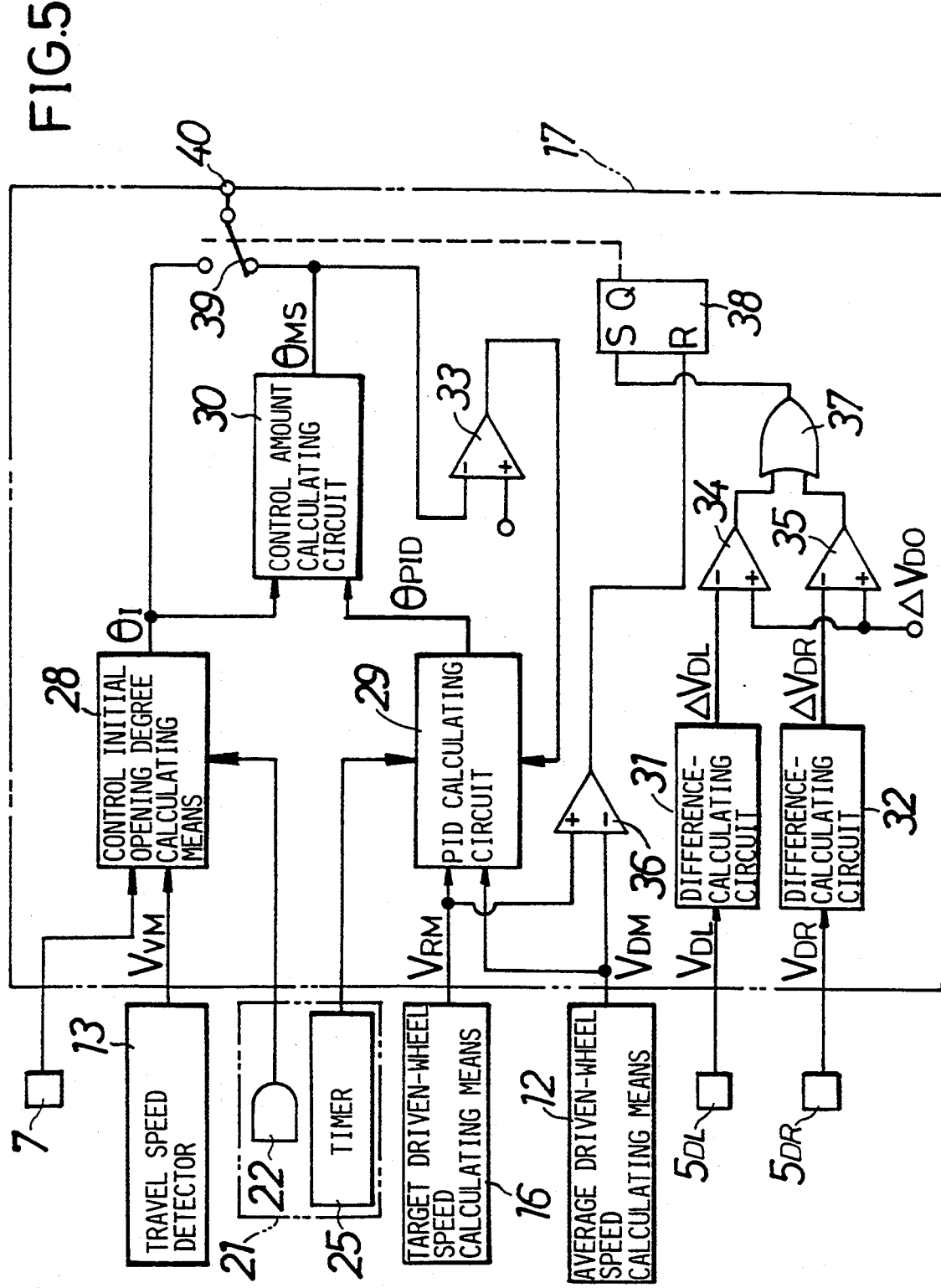
FIG. 5 is a block diagram illustrating the arrangement of a control signal producing means.

Referring to FIG. 5, the control signal producing means 17 comprises a control initial opening degree determination circuit 28; a PID calculating circuit 29; difference-calculating circuits 31 and 32; comparators 33, 34, 35 and 36; an OR gate 37; a flip-flop 38; and a switch circuit 39.

When a high level signal from the AND gate 22 of the control limiting means 21 is inputted to the control initial opening degree determination circuit 28 in order to start the control of the operation to increase the output from the engine E in response to the excessive slipping produced by either one of the driven wheels $W_{DL}$ and $W_{DR}$ during engine brake, the control initial opening degree determination circuit 28 determines a target engine RPM value $N_{EI}$ on the basis of the detection values detected at that time by the gear position detector 7 and the travel speed detector 13 to determine an initial throttle opening degree $\Theta_I$ from such target engine RPM value $N_{EI}$.

In the control initial opening degree determination circuit 28, the target engine RPM value $N_{EI}$ corresponding to the current wheel speed is calculated according to the following expression on the basis of the gear position in the transmission M and the vehicle travel speed $V_{VM}$ in response to the reception of the high level signal from the AND gate 22 thereinto:

$$N_{EI}=(V_{VM}\times 1,000/60)\times(1/(2\pi\times radius\ of\ tire))\times gear\ ratio$$

wherein the radius of tire is, for example, 0.292 m, and the gear ratio is determined in correspondence to the gear position, as given in Table 2 below.

TABLE 2

| | Gear position | | | |
|---|---|---|---|---|
| | First shift | Second shift | Third shift | Fourth shift |
| Gear ratio | 11.940 | 6.297 | 4.742 | 3.263 |

The initial throttle opening degrees $\Theta_I$ corresponding to the target engine RPM values $N_{EI}$ have been previously determined as given in Table 3 below, and the initial throttle opening degree $\Theta_I$ corresponding to the target engine RPM value $N_{EI}$ obtained by the above-described calculation is found from Table 3.

TABLE 3

| | $N_{EI}$ (rpm) | | | | | | |
|---|---|---|---|---|---|---|---|
| <1500 | ~2000 | ~2500 | ~3000 | ~3500 | ~4000 | ~4500 | >4500 |
| $\Theta_I$ (deg) 1 | 2 | 3 | 5 | 6 | 7 | 7 | 9 |

The PID calculating circuit 29 calculates a PID control value $\Theta_{PID}$ of throttle opening degree on the basis of the average driven wheel speed $V_{DM}$ and the target driven wheel speed $V_{RM}$ according to the following expression (1):

$$\Theta_{PID(K)} = K_K \times (K_P \times P_{(K)} + K_I \times I_{(K)} + K_D \times D_{(K)}) \quad (1)$$

wherein
$P_{(K)} = V_{DM(K)} - V_{RM(K)}$,
$I_{(K)} = P_{(K)} + I_{(K-1)}$,
$D_{(K)} = P_{(K)} - P_{(K-1)}$, and
each of $K_K$, $K_P$, $K_I$ and $K_D$ is a constant.

The PID calculating circuit 29 is arranged, such that renewing of P and I members of the expression, i.e., shifting from $P_{(K)}$ to $P_{(K-1)}$ and shifting from $I_{(K)}$ to $I_{(K-1)}$ are not carried out, when a high level signal input is received to the PID calculating circuit 29 from the comparator 33, and so that $P_{(K)}$, $I_{(K)}$ and $D_{(K)}$ are reset, when a low level signal indicative of the terminating of the control is received to the PID calculating circuit 29 from the timer 25 of the control limiting means 21.

The control amount calculating circuit 30 calculates a control amount $\Theta_{MS}$ according to the following expression (2) on the basis of the throttle opening degree $\Theta_I$ determined in the control initial opening degree determination circuit 28 and the PID control value $\Theta_{PID}$ of throttle opening degree determined in the PID calculating circuit 29:

$$\Theta_{MS(K)} = \Theta_I - \Theta_{PID(K)} \quad (2)$$

An output from the control amount calculating circuit 30 is supplied to an inverted input terminal of the comparator 33, and a reference value corresponding to 0 (zero) degrees is applied to a non-inverted input terminal of the comparator 33. Thus, the comparator 33 applies a high level signal to the PID calculating circuit 29, when the relationship, $\Theta_{MS} < 0$, is established.

Each of the difference calculating circuits 31 and 32 calculates a speed difference $\Delta V_{DL}$, $\Delta V_{DR}$, respectively, upon every calculation of the driven wheel speeds $V_{DL}$ and $V_{DR}$. Outputs from the difference calculating circuits 31 and 32 are applied to inverted input terminals of the comparators 34 and 35, respectively. On the other hand, a predetermined value $\Delta V_{D0}$, e.g., −0.3 km/hr, has been inputted to a non-inverted input terminal of each of the comparators 34 and 35. Each of the comparators 34 and 35 produces a high level signal, when each of $\Delta V_{DL}$ and $\Delta V_{DR}$ is smaller than the predetermined value $\Delta V_{D0}$, i.e., when each of the driven wheel speeds $V_{DL}$ and $V_{DR}$ drops greatly. On the other hand, the outputs from the comparators 34 and 35 are applied in parallel to the OR gate 37. Thus, the OR gate 37 produces a high level signal, when at least one of the comparators 34 and 35 produces a high level signal, i.e., when at least one of the driven wheel speeds $V_{DL}$ and $V_{DR}$ drops greatly.

The output from the OR gate 37 is supplied to a set input terminal of the flip-flop 38, and the output from the comparator 36 is supplied to a reset input terminal of the flip-flop 38. Thus, the comparator 36 supplies a high level signal to the reset terminal of the flip-flop 38, when the target driven wheel speed $V_{RM}$ becomes larger than the average driven wheel speed $V_{DM}$.

The switch circuit 39 is arranged such that it can be alternatively switched in accordance with the output from the flip-flop 38 between a state for delivering the initial throttle opening degree $\Theta_I$ determined in the control initial opening degree determination circuit 28 through an output terminal 40, and a state for delivering the control amount $\Theta_{MS}$ determined in the PID control amount determination circuit 29 through the output terminal 40. The initial throttle opening degree $\Theta_I$ determined in the control initial opening degree determination circuit 28, is applied from the switch circuit 39 to the output terminal 40, when the output from the flip-flop 38 reaches a high level. The control amount $\Theta_{MS}$ determined in the control amount calculating circuit 30 is applied from the switch circuit 39 to the output terminal 40, when the output from the flip-flop 38 is at a low level.

The operation of this embodiment will be described below with reference to FIG. 6. If it is decided that an excessive slipping has been produced in at least one of the driven wheels $W_{DL}$ and $W_{DR}$ during engine braking, then the operation of the actuator 3 is controlled by the control unit 4 so as to open the throttle valve 2 to increase the output from the engine E. The control to increase the output from the engine E is started only when the downshifting has been conducted for at least one second, or when the sudden releasing-off of the accelerator pedal has been conducted for at least one second. Therefore, the control to increase the output from the engine E is started after the driver's operation is ascertained. This ensures that even if the variation in wheel speed is large during travelling of the vehicle on a bad road, the control to increase the output from the engine E cannot be carried out in case of unnecessity, leading to an improvement in feeling of operation.

Figure 6:
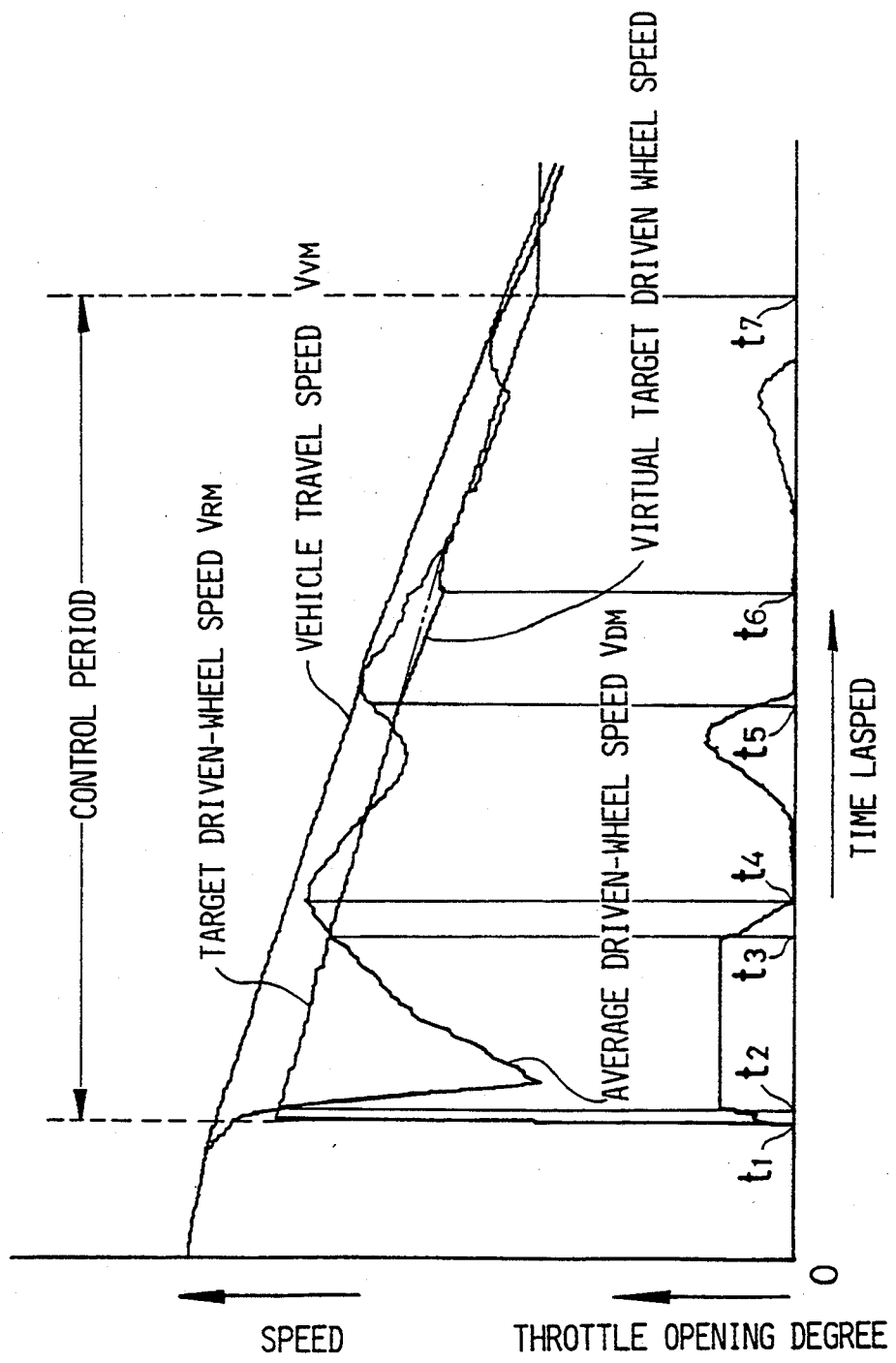
FIG. 6 is a diagram illustrating one example of control.

When the control of the operation of the actuator 3 to increase the output from the engine E is started at a time point $t_1$ shown in FIG. 6, the control amount $\Theta_{MS}$ is gradually increased, but maintained at a given value $\Theta_I$ at a time point $t_2$ when the dropping of either one of the driven wheel speeds $V_{DL}$ and $V_{DR}$ is increased. This state in which the control amount $\Theta_{MS}$ is maintained at the given value $\Theta_I$ is sustained till a time point $t_3$ when the average driven wheel speed $V_{DM}$ exceeds the target driven wheel speed $V_{RM}$. In other words, the control amount $\Theta_{MS}$ is maintained at the given value $\Theta_I$ at a time point when either one of differentiation values of the driven wheel speeds $V_{DL}$ and $V_{DR}$ becomes larger than a negative value set at a constant level. This is for the purpose of preventing an overshooting of output by executing the PID control following the sudden change of the driven wheel speed $V_{DL}$ or $V_{DR}$. Thus, hunting of the control can be prevented to perform a smooth control.

If the average driven wheel speed $V_{DM}$ exceeds the target driven wheel speed $V_{RM}$ at the time point $t_3$, the control amount $\Theta_{MS}$ is returned again to the level in the PID control and is decreased with an increase in the average driven wheel speed $V_{DM}$. The renewing of the P and I members in the PID calculation is stopped from a time point $t_4$ when the control amount $\Theta_{MS}$ becomes negative, so that the control amount $\Theta_{MS}$ cannot be increased toward the negative side in accordance with the reduction in the average driven wheel speed $V_{DM}$. Thus, it is possible to prevent an undershooting of the output based on the PID control and to avoid the retarding of the change in control amount $\Theta_{MS}$ toward the positive side, thereby providing a smooth control.

From a time point $t_5$ when the vehicle travel speed $V_{VM}$ minus the average driven wheel speed $V_{DM}$ becomes equal to or less than 2 km/hr, a value reduced from the last target driven wheel speed by the successive decrement determined in accordance with the deceleration (differentiation value) of the now or current vehicle travel speed $V_{VM}$ becomes a virtual target driven wheel speed. Thus, it is possible to avoid a rising tendency of the target driven wheel speed due to the fact that the driven wheel speed $V_{DM}$ is restored to the extent that it is too close to the vehicle travel speed $V_{VM}$, thereby providing an effective engine brake.

Figure 3:
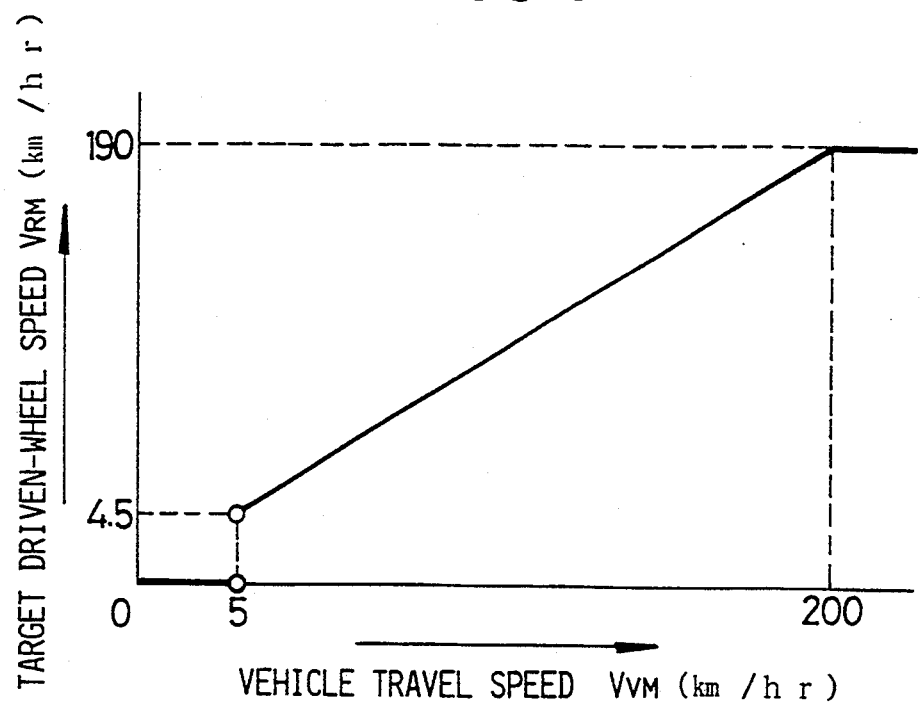
FIG. 3 illustrates a table for providing a tentative target driven wheel speed.

At a time point $t_6$ when the vehicle travel speed $V_{VM}$ minus the average driven wheel speed $V_{DM}$ exceeds 2 km/hr, the target driven wheel speed $V_{RM}$ is restored to a value obtained from the map shown in FIG. 3.

When the condition in which both of the relationships $(\Theta_{MS}-\Theta_{TAB}\leq\Delta\Theta_0)$ and $(|V_{VM}-V_{DM}|<\Delta V_0)$ are established, is continued for 500 ms or more, it is decided that the control should be terminated. Thus, the control to increase the output from the engine E is terminated at a time point $t_7$ when a given time is lapsed after such decision.

The control signal producing means 17 finds an initial throttle opening degree $\Theta_I$ on the basis of the vehicle travel speed $V_{VM}$ and the gear position in the transmission M at the time when it is decided that the output from the engine E should be increased, thereby outputting a difference between such initial throttle opening degree $\Theta_I$ and the control value $\Theta_{PID}$ resulting from the PID calculation as a control amount $\Theta_{MS}$. The initial throttle opening degree $\Theta_I$ is obtained from the target engine revolution number $N_{EI}$ based on the vehicle travel speed $V_{VM}$ and the gear position in the transmission M at the time when it is decided that the output from the engine E should be increased. Therefore, it is possible to provide improvements in responsiveness and accuracy of the control, as compared with the control of the operation of the actuator to increase the output from the engine E in accordance with the difference between the follower wheel speed, i.e., the vehicle travel speed $V_{VM}$ and the average driven wheel speed $V_{DM}$.

Figure 7:
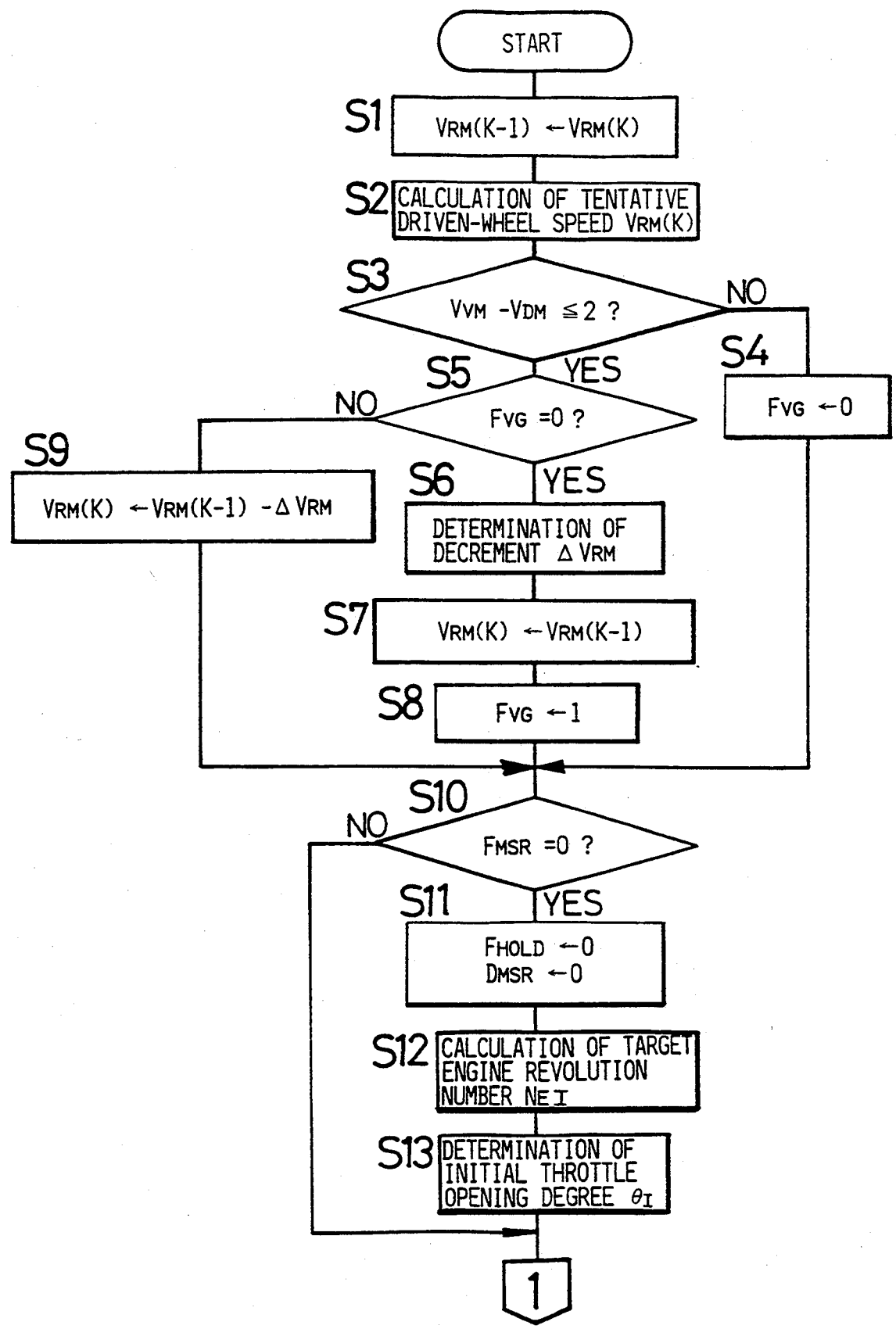
FIGS. 7 to 9 show a flow chart illustrating a control procedure.
Figure 8:
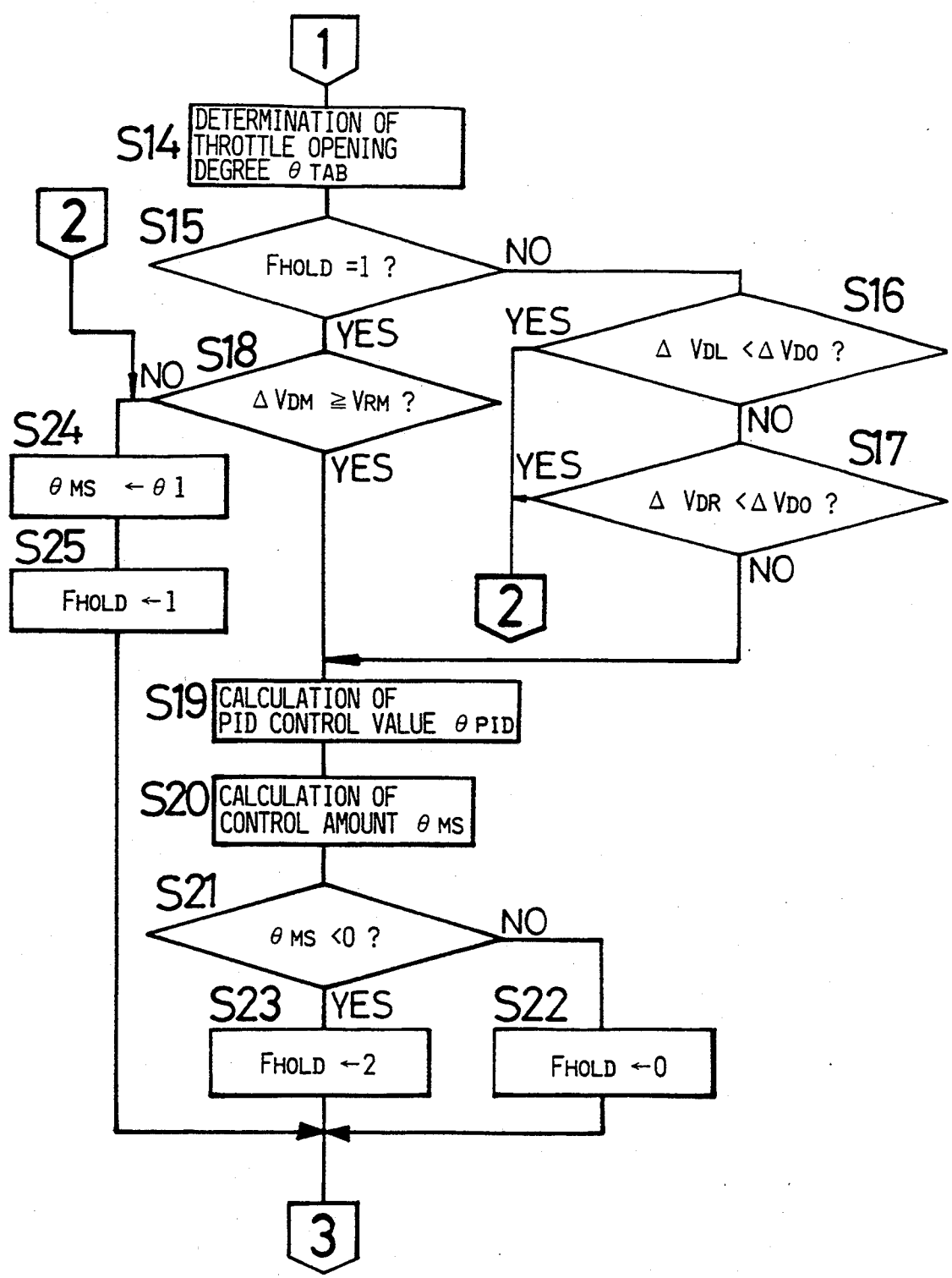
Figure 9:
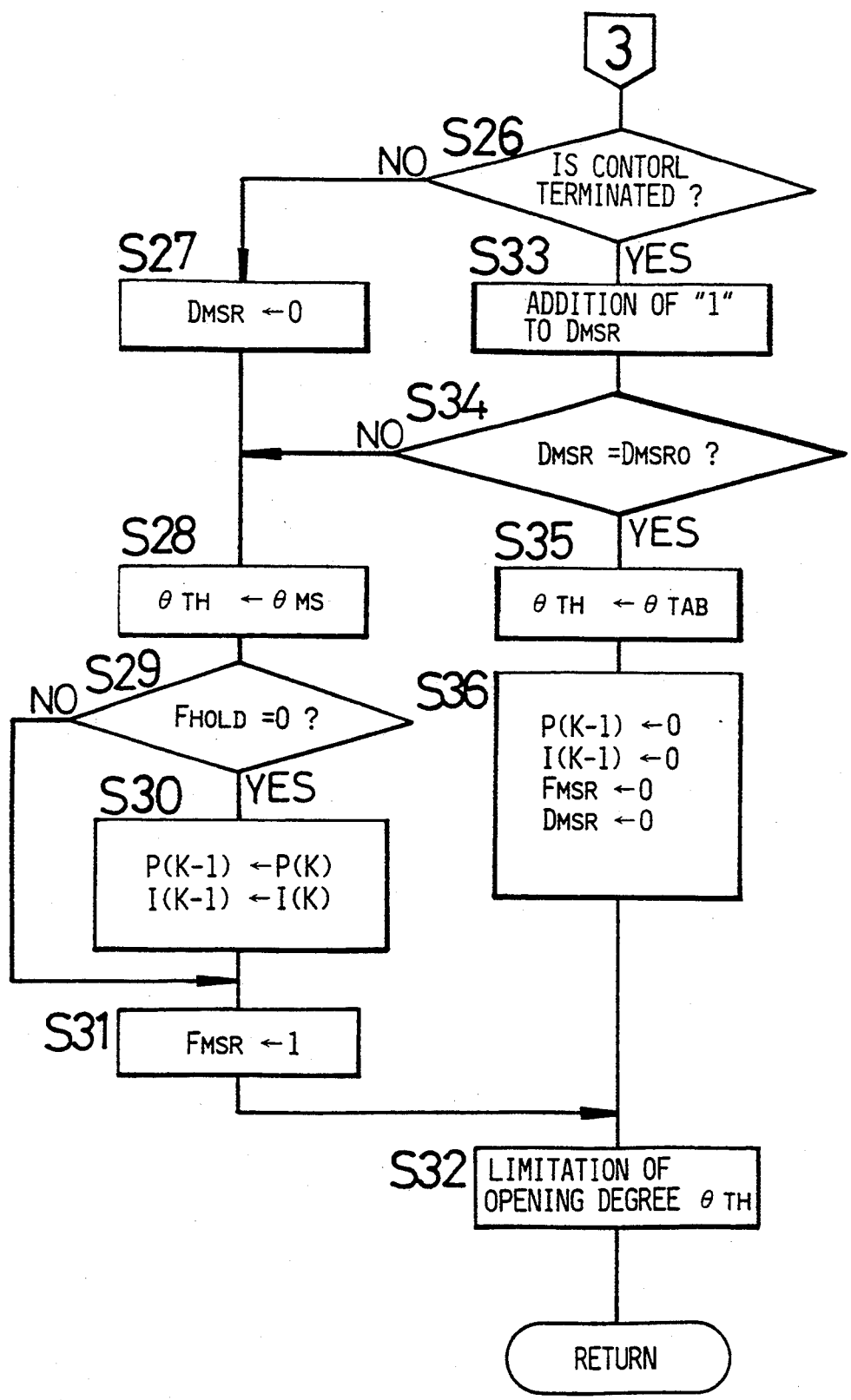

The series of the above-described controls may be carried out by a computer, and in such a case, the processing procedure after establishment of the control starting condition is as shown in FIGS. 7, 8 and 9.

Referring first to FIG. 7, at a first step S1, a target driven wheel speed $V_{RM(K)}$ obtained by a k-th calculation is replaced by a target driven wheel speed $V_{RM(K-1)}$ obtained by a (k−1)-th calculation. At step S2, a tentative target driven wheel speed $V_{RM(K)}$ is calculated on the basis of the map shown in FIG. 3. Then, it is judged at step S3 whether or not a value resulting from subtraction of the average driven wheel speed $V_{DM}$ from the vehicle travel speed $V_{VM}$ is equal to or less than 2 km/hr ($V_{VM}-V_{DM}\leq 2$). If $V_{VM}-V_{DM}>2$, the processing is advanced via step S4 to step S10. If $V_{VM}-V_{DM}\leq 2$, the processing is advanced from step S3 to step S5.

At step S4, a flag $F_{VG}$ is set at "0". This flag $F_{VG}$ is a virtual target driven wheel speed calculating flag. The relationship, $F_{VG}=0$, indicates a state in which the target driven wheel speed $V_{RM}$ is determined on the basis of the map shown in FIG. 3. The relationship, $F_{VG}=1$, indicates a state in which the virtual target driven wheel speed is used as the target driven wheel speed $V_{RM}$.

At step S5, it is judged whether or not $F_{VG}=0$. If $F_{VG}=0$ at step S5, the processing is advanced to step S6, at which the successive decrement $\Delta V_{RM}$ is determined according to Table 1 based on the difference value between the vehicle travel speeds $V_{VM}$. At step S7, the last target driven wheel speed $V_{RM(K-1)}$ is replaced by the current target driven wheel speed $V_{RM(K)}$, and at step S8, the flag $F_{VG}$ is set at "1" ($F_{VG}=1$), progressing to step S10.

If it is decided at step S5 that $F_{VG}=1$, i.e., in a condition in which the virtual target driven wheel speed is used as target driven wheel speed $V_{RM}$, a calculation according to the expression ($V_{RM(K)}=V_{RM(K-1)}-\Delta V_{RM}$) is carried out, progressing to step S10.

At the first to ninth steps S1 to S9, the calculation carried out in the target driven wheel speed calculating means 16 shown in FIG. 2 is carried out. More specifically, the target driven wheel speed $V_{RM}$ obtained in consideration of the predetermined slip rate in addition to the vehicle travel speed $V_{VM}$ is tentatively determined in accordance with the vehicle travel speed $V_{VM}$ from the map shown in FIG. 3. Such tentative value is used as the target driven wheel speed $V_{RM}$, when the vehicle travel speed $V_{VM}$ minus the average driven wheel speed $V_{DM}$ assumes a value exceeding 2 km/hr, while the virtual target driven wheel speed reduced from the last target driven wheel speed by a successive decrement determined in accordance with the deceleration (differentiation value) of the vehicle travel speed $V_{VM}$ is used as the target driven wheel speed $V_{RM}$, when the vehicle travel speed $V_{VM}$ minus the average driven wheel speed $V_{DM}$ is equal to or less then 2 km/hr.

At step S10, it is judged whether or not a flag $F_{MSR}$ is equal to "0". This flag $F_{MSR}$ indicates whether or not the control for increasing the output from the engine E is being carried out. The relationship, $F_{MSR}=0$, indicates that the control is not being carried out, and the relationship, $F_{MSR}=1$, indicates that the control is being carried out. If it is decided at step S10 that $F_{MSR}=0$, the processing is advanced to step S11, and if it is decided at step S10 that $F_{MSR}=1$, the processing is advanced to a 14th step shown in FIG. 8 to bypass steps S11 to S13.

At step S11, a flag $F_{HOLD}$ is set at "0", and a delay counter $D_{MSR}$ is set "0". The flag $F_{HOLD}$ indicates the state of maintaining the control amount. The relationship, $F_{HOLD}=0$, indicates a state in which the control amount is not maintained, and the relationship, $F_{HOLD}=1$, indicates a state in which the control amount is maintained at the initial throttle opening degree $\Theta_I$ and in which the renewing of the proportion member, i.e., P member and the integration member, i.e., I member in the PID calculation are prohibited. The relationship, $F_{HOLD}=2$, indicates a state in which the P and I members in the PID calculation are prohibited. The counter $D_{MSR}$ is a delay counter to which one is added whenever all the calculations shown in FIGS. 8 and 9 are carried out, when the control is terminated.

At step S12, a target engine RPM value $N_{EI}$ is calculated on the basis of the vehicle travel speed and the gear position in the transmission M. At step S13, an initial throttle opening degree $\Theta_I$ is determined according to FIG. 3 on the basis of such target engine RPM value $N_{EI}$.

At step S14 shown in FIG. 8, a throttle opening degree $\Theta_{TAB}$ corresponding to the operation amount of the accelerator pedal is determined, and at step S15, it is judged whether or not the flag $F_{HOLD}$ is equal to "1".

If it is decided at step S15 that $F_{HOLD}=0$ or 2, it is judged whether or not at least one of the driven wheel speeds $V_{DL}$ and $V_{DR}$ has not been dropped largely, through steps S16 and S17. If it is decided that at least one of the driven wheel speeds $V_{DL}$ and $V_{DR}$ has not been dropped largely, the processing is advanced to step S19. If it is decided that at least one of the driven wheel speeds $V_{DL}$ and $V_{DR}$ has been dropped largely, the processing is advanced to step S24.

If it is decided at step S15 that $F_{HOLD}=1$, it is judged at step S18 whether or not the average driven wheel speed $V_{DM}$ is equal to or more than the target driven wheel speed $V_{RM}$. If $V_{DM} \geq V_{RM}$, the processing is advanced to step S19. If $V_{DM}<V_{RM}$, the processing is advanced-to step S24.

At step S19, a PID control value $\Theta_{PID}$ is calculated according to the above-described expression (1) and at step S20, a control amount $\Theta_{MS}(=\Theta_I-\Theta_{PID})$ is calculated. Then, it is judged at step S21 whether or not the control value $\Theta_{MS}$ is negative ($\Theta_{MS}<0$). If $\Theta_{MS} \geq 0$, the flag $F_{HOLD}$ is set at "0" at step S22, progressing to step S26 shown in FIG. 9. If $\Theta_{MS}<0$, the flag $F_{HOLD}$ is set at "2" at step S23, progressing to step S26.

At step S24, the initial throttle opening degree $\Theta_I$ is set as the control value $\Theta_{MS}$, and then, the flag $F_{HOLD}$ is set at "1" at step S25, progressing to step S26.

At step S26 shown in FIG. 9, it is judged whether or not it is the time at which the control should be terminated. If it is decided that it is not the time at which the control should be terminated, the counter $D_{MSR}$ is set at "0" at step S27, progressing to step S28, at which the opening degree $\Theta_{TH}$ of the throttle valve 2 is determined as the control value $\Theta_{MS}$. Then, it is judged at step S29 whether or not the flag $F_{HOLD}$ is equal to "0". If $F_{HOLD}=0$, the proportion member, i.e., P member, and the integration member, i.e., I member, in the PID calculation are renewed at step S30, progressing to step S31. If $F_{HOLD}=1$ or 2, the processing is advanced to step S31 to bypass step S30. In other words, if $F_{HOLD}=1$ or 2, the renewing of the proportion member, i.e., P member, and the integration member, i.e., I member, in the PID calculation is prohibited.

At step S31, the flag $F_{MSR}$ is set at "1" and then the limitation of the opening degree $\Theta_{TH}$ of the throttle valve 2 is carried out at step S32, returning to the start.

If it is decided at step S26 that it is the time at which the control should be terminated, "1" is added to the counter $D_{MSR}$ at step S33 and then it is judged at step S34 whether or not the counter $D_{MSR}$ has reached a predetermined value $D_{MSR0}$, the processing is advanced to step S28. If the counter $D_{MSR}$ has reached a predetermined value $D_{MSR0}$, the processing is advanced to step S35.

At step S35, the opening degree of the throttle valve 2 is determined at an opening degree $\Theta_{TAB}$ determined from a table, i.e., a value corresponding to the amount of accelerator pedal operated by the vehicle's driver. At step S36, the last P member ($P_{(K-1)}$) and the last I member ($I_{(K-1)}$) in the PID calculation are reset at "0", and the flag $F_{MSR}$ and the counter $D_{MSR}$ are reset at "0", progressing to step S32.

Such 14th to 36th steps ensure that when at least one of the driven wheel speeds $V_{DL}$ and $V_{DR}$ suddenly falls greatly, the control value $\Theta_{MS}$ is maintained at a given initial throttle opening degree $\Theta_I$, until the average driven wheel speed $V_{DM}$ becomes equal to or more than the target driven wheel speed $V_{RM}$. When the control value $\Theta_{MS}$ has reached a negative value, the renewing of the P and I members in the PID calculation is stopped and is in a stopped state until the control value $\Theta_{MS}$ is restored. If it is decided that the control should be terminated, the termination of the control is retarded until a predetermined time has lapsed from such decision.

In the above embodiment, the renewing of the P and I members in the PID calculation is stopped when the control value $\Theta_{MS}$ has reached a negative value, it will be understood that only the I member may be invalidated (i.e., brought into "0"). In such a case, an undershooting of the control can be prevented by eliminating the accumulation of a minus portion of the I member which is the integration member, thereby providing a smooth control.

What is claimed is:

1. A method foe preventing slipping of a vehicle, by judging whether or not there is an excessive slipping of driven wheels on a basis of detection values detected by driven wheel speed detectors for detecting driven wheel speeds and detection values detected by follower wheel speed detectors for detecting follower wheel speeds, such that if it is decided that there is excessive slipping, an actuator is operated to change an output from an engine mounted in the vehicle, wherein said method comprises the steps of:

detecting a gear position in a transmission disposed between the engine and driven wheels;

determining a target engine RPM value on a basis of said gear position and said detection values of the follower wheel speeds at a time when it is decided that there is excessive slipping; and determining a control amount for operation of the actuator on a basis of said target engine RPM value.

2. A method for preventing slipping of a vehicle as recited in claim 1, wherein the actuator is operated to increase the output from the engine to prevent slipping of the vehicle during an engine braking operation, and wherein said detecting step further comprises the step of:

detecting that a downshift in said gear position has occurred to cause engine braking.

3. A method for preventing slipping of a vehicle as recited in claim 1, wherein the actuator is operated to increase the output from the engine to prevent slipping of the vehicle during an engine braking operation, further comprising the step of:

detecting a variation rate in a throttle opening degree toward a closed state to cause engine braking.

* * * * *